Aug. 19, 1941.          W. WENTHE          2,253,217
TRAILER
Filed June 2, 1939
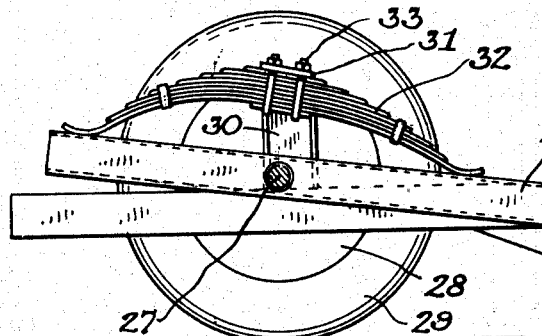
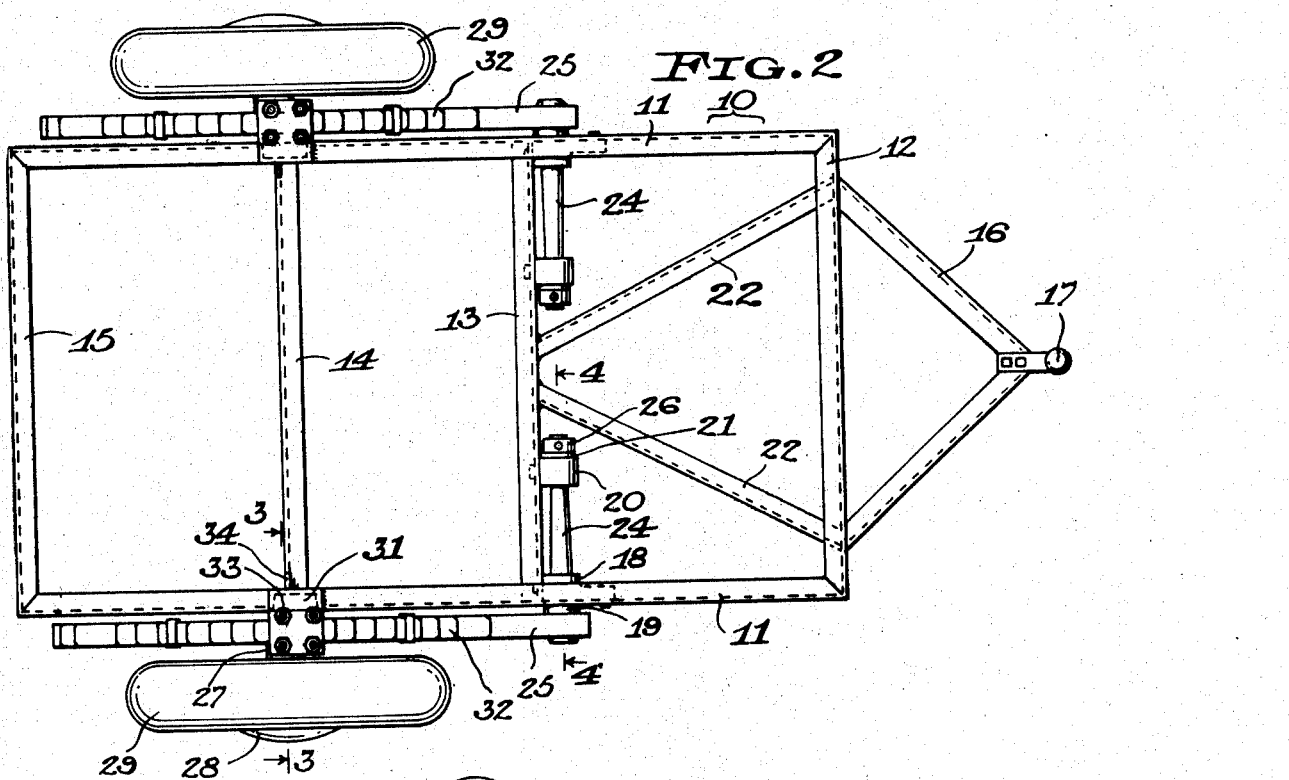
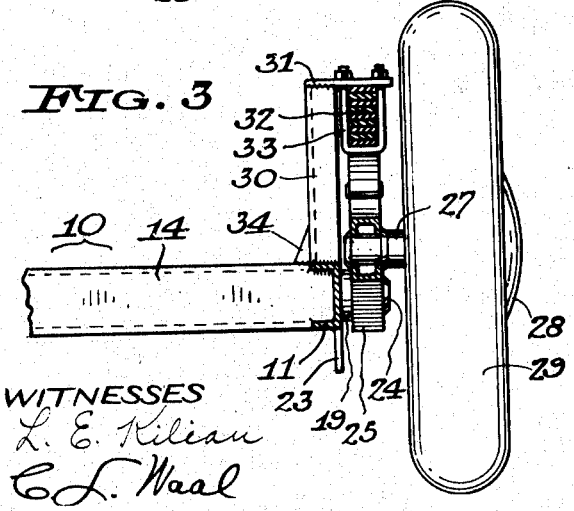
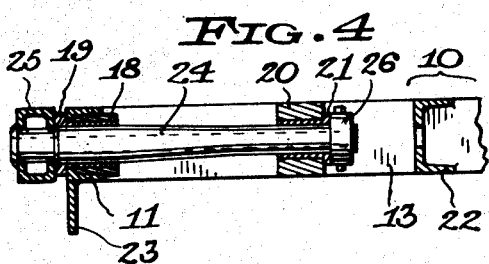
INVENTOR
WILLIAM WENTHE
BY R. S. Caldwell
ATTORNEY
WITNESSES
L. E. Kilian
C. L. Neal Patented Aug. 19, 1941

2,253,217

UNITED STATES PATENT OFFICE 2,253,217

TRAILER

William Wenthe, Milwaukee, Wis.

Application June 2, 1939, Serial No. 276,983

6 Claims. (Cl. 280—124)

This invention relates to wheeled vehicles and more particularly to trailers.

An object of the invention is to provide a wheeled vehicle having an improved form of spring mounting which will simplify construction, reduce unsprung weight, and adequately absorb road shocks under light and heavy loading of the vehicle.

Another object is to provide a vehicle having improved wheel mountings which are independently sprung and which will reduce side-sway of the vehicle.

A further object is to provide a vehicle which will permit a relatively low frame mounting without unduly reducing road clearance.

The invention further consists in the several features hereinafter described and claimed.

In the accompanying drawing, illustrating one form of trailer vehicle embodying the invention, Fig. 1 is a side elevation of the vehicle, the near wheel of the vehicle being removed, and parts being shown in section;

Fig. 2 is a top view of the vehicle;

Fig. 3 is a sectional elevation taken generally along the line 3—3 of Fig. 2, and Fig. 4 is a detail sectional elevation taken generally along the line 4—4 of Fig. 2.

In the drawing, the invention is illustrated as embodied in a two-wheeled trailer. The trailer has a frame 10 comprising longitudinal side members 11 rigidly connected by a plurality of cross-members 12, 13, 14 and 15, the front cross member, 12, being rigidly joined to a forwardly and upwardly converging front extension 16 carrying a suitable hitch or coupling member 17 by which the trailer may be towed. The various frame members are preferably formed of structural metal shapes, such as channel bars, rigidly welded together.

A pair of outer bearing members 18 are welded or otherwise rigidly secured to the respective side members 11 and cross member 13 and carry flanged bearing bushings 19, and a pair of inner bearing members 20 spaced from the outer bearing members are welded or otherwise rigidly secured to the cross member 13 and carry flanged bearing bushings 21, the several bearing bushings having a common horizontal axis extending transversely of the trailer frame. Brace members 22 extend forwardly and laterally from the intermediate portion of the cross member 13 to the front member 12 and are welded thereto, and in some instances triangular gusset plates 23 are welded to the side members 11 below the bearing members 18.

A pair of aligned horizontal rock-shafts 24 are journaled in the bushings of the bearing members 18 and 20, each shaft being carried by one of the outer bearing members 18 and by the adjacent inner bearing member 20. Each rock-shaft has a slightly reduced outer end which projects outwardly from the flanged outer end of the associated bearing bushing 19 and extends through the apertured front end portion of a metal arm 25 to which the shaft is rigidly secured, preferably by welding. The arm 25 is tubular and of box cross-section with its longer transverse dimension vertical, and bears at its inner face against the flanged outer end of the bearing bushing 19. The inner end portion of the rock-shaft, which is here shown to be of smaller diameter than the outer end, projects through the bearing bushing 21 and carries a collar 26 which is pinned or otherwise secured to the shaft and which bears against the flanged end of the bushing 21, thus confining the rock-shaft against axial displacement. If desired, each rock-shaft 24 may be of tubular form to receive therethrough brake shafts or other members, not shown.

The arms 25 are substantially parallel and extend rearwardly from the supporting rock-shafts 24, each arm being adjacent to a side member 11 of the trailer frame. Each arm is apertured at an intermediate portion to receive the end of a stub axle 27 which is welded or otherwise rigidly secured to the arm. Each axle extends parallel to the rock-shafts and each carries a road wheel 28 provided with a pneumatic tire 29.

A pair of upstanding members 30, such as channel bars, are welded or otherwise rigidly secured to the respective side members 11 of the trailer frame at points spaced rearwardly from the rock-shafts 24 and preferably near the paths of the stub axles. At its upper end each upstanding member 30 rigidly carries an outwardly projecting plate 31 which provides a spring seat at its under-side. An arched leaf spring 32 of the semi-elliptic type is rigidly secured to the under-side of the plate 31, as by U-bolts 33, and has its opposite rounded free ends slidably bearing on the flat upper face of the arm 25 therebelow, the spring and arm being disposed in the same vertical plane. The spring mounting plate 31 is set at a suitable angle on the upstanding member 30. The twisting tendency on the side members of the frame when the spring is deflected under load is resisted by the cross member 14 which has its ends rigidly welded to the frame side members 11 adjacent to the upstanding members 30. If desired, gusset plates 34, Figs. 2 and 3, may be welded to the cross member 14 and to the respective upstanding members.

The front ends of the brace members 22 are secured to the front cross member 12 in alignment with the rear ends of the front coupling extension 16 so as to resist twisting of this cross member and yielding of the extension.

The radius from each rock-shaft to the rear end of the corresponding leaf spring 32 is considerably greater than the radius to the front end of the spring. The leaf spring is preferably, but not necessarily, of the symmetrical type reversible end for end.

When the vehicle sustains its normal load, the opposite ends of each leaf spring are preferably under substantially the same deflection and load, and the spring ends are approximately equidistant from the stub axle. Under this loading, the twisting stresses on the anchored middle portions of the springs are minimized and the vertical load on the rock-shafts is relatively small. When the load is increased, the rear end of each spring assumes an increasing proportion of the load increment, and when the load is decreased, the front end of the spring assumes most or all of the reduced load. The load may be mounted directly on the trailer frame, or it may be carried by a suitable body, not shown, secured to the frame.

In operation, when the trailer is towed, the wheels will rise and fall when passing over road irregularities, the two wheel mounting arms 25 swinging independently but the planes of the wheels remaining parallel. The spring action varies with the load, being "softer" under light loads, because of the reduced effectiveness of the rear ends of the springs, thus avoiding hard or stiff riding under light loads. Under heavy loads the rear spring ends become increasingly effective, thus providing additional spring support. The load is distributed among the spring ends and the rock-shafts, thus avoiding unduly large concentrated loads. When turning corners, the wheel mounting arms 25 are confined against lateral movement by the rock-shafts 24 on which they are secured, thus minimizing side-sway of the trailer. For any given relative angular displacement of each wheeled arm with respect to the frame, the rear end of the corresponding leaf spring will have a greater deflection than the front end of the spring.

The absence of a cross axle permits the use of a relatively low frame without unduly reducing road clearance, and also permits a reduction of unsprung weight. With minor changes the same frame can be placed at various heights above the ground, it being only necessary to select upstanding frame members 30 of suitable height, to place the spring seat plates 31 at a suitable angle, and, in some instances, to change the angle of the coupling extension 16. The greater part of the mass of the springs 32 is carried on the frame, thus further reducing unsprung weight.

What I claim as new and desire to secure by Letters Patent is:

1. In a vehicle, the combination of a frame, a pair of independently swingable wheeled arms at opposite sides of said frame, each arm having a pivotal mounting on said frame and each being swingable about a substantially horizontal transverse axis, and a pair of leaf springs for the respective arms, each spring being rigidly secured intermediate its ends on said frame and each having opposite deflectable end portions acting on the corresponding arm at different distances from the pivotal axis of said arm and at the same side of said arm from said pivotal axis.

2. In a vehicle, the combination of a frame having longitudinal side members and a cross member rigidly connecting said side members, wheeled arms swingably mounted on said frame, upstanding members rigidly secured to said frame adjacent to the junctions of said side members and cross member and each having an outwardly projecting part, and leaf springs rigidly secured at intermediate portions to said respective outwardly projecting parts and having deflectable end portions acting on said arms.

3. In a vehicle, the combination of a frame having opposite side portions, wheeled arms swingably mounted on said frame, upstanding members rigidly secured to the opposite side portions of said frame, and leaf springs for the respective arms rigidly secured at their intermediate portions to said respective upstanding members and having deflectable opposite end portions acting on said arms, each spring acting on one of said arms.

4. In a vehicle, the combination of a frame having a spring seat, a wheeled arm swingably mounted on said frame and extending below said spring seat, and a leaf spring rigidly secured at an intermediate portion to said spring seat and having opposite deflectable end portions acting on said arm at different distances from the pivotal axis of said arm and at the same side of said arm from said pivotal axis.

5. In a vehicle, the combination of a frame, a wheeled arm swingably mounted on said frame, and a leaf spring rigidly secured at an intermediate portion to said frame and having opposite deflectable end portions acting on said arm at different distances from the pivotal axis of said arm and at the same side of said arm from said pivotal axis.

6. In a vehicle, the combination of a frame, an arm swingably mounted on said frame, a wheel rotatably carried by said arm at a distance from the pivotal mounting of said arm, and resilient means for yieldingly resisting relative swinging movement of said arm with respect to said frame, said resilient means comprising a leaf spring rigidly secured at an intermediate portion to said frame and having opposite deflectable end portions acting on said arm at spaced points on one side of said pivotal mounting and on opposite sides of the wheel axis.

WILLIAM WENTHE.